US010268691B2

(12) United States Patent
Emison et al.

(10) Patent No.: US 10,268,691 B2
(45) Date of Patent: Apr. 23, 2019

(54) METHOD OF MODELING ROOF AGE OF A STRUCTURE

(71) Applicant: BuildFax, Asheville, NC (US)

(72) Inventors: Joseph Tierney Masters Emison, Asheville, NC (US); Holly Ward Tachovsky, Austin, TX (US); Richard W. White, Trumbull, CT (US)

(73) Assignee: BuildFax, Asheville, NC (US)

( * ) Notice: Subject to any disclaimer, the term of this patent is extended or adjusted under 35 U.S.C. 154(b) by 0 days.

(21) Appl. No.: 14/696,968

(22) Filed: Apr. 27, 2015

(65) Prior Publication Data
US 2015/0228031 A1 Aug. 13, 2015

Related U.S. Application Data

(63) Continuation-in-part of application No. 14/265,816, filed on Apr. 30, 2014, now abandoned, and a continuation-in-part of application No. 14/147,266, filed on Jan. 3, 2014, now abandoned.

(51) Int. Cl.
G06Q 40/08 (2012.01)
G06F 17/30 (2006.01)

(52) U.S. Cl.
CPC ....... *G06F 17/30076* (2013.01); *G06Q 40/08* (2013.01)

(58) Field of Classification Search
CPC .................. G06F 17/30076; G06Q 40/08
USPC ............................................................ 705/4
See application file for complete search history.

(56) References Cited

U.S. PATENT DOCUMENTS

| | | | |
|---|---|---|---|
| 6,633,857 B1* | 10/2003 | Tipping | G06N 3/0472 706/16 |
| 7,966,203 B1 | 6/2011 | Pietrzak | |
| 8,027,850 B1 | 9/2011 | Pietrzak | |
| 8,244,563 B2 | 8/2012 | Coon et al. | |
| 9,245,201 B1 | 1/2016 | Jin et al. | |

(Continued)

OTHER PUBLICATIONS

BuildFax Provides Consumers with New Tool for Understanding the "Life Story" of a Structure Including Vital Permit Information; Jun. 27, 2011; Business WireAvailable at http://www.businesswire.com/news/home/20110627005389/en/BuildFax-Consumers-Tool-Understanding-%E2%80%9CLife-Story%E2%80%9D-Structure.

(Continued)

*Primary Examiner* — Shahid Merchant
*Assistant Examiner* — Michael J Warden
(74) *Attorney, Agent, or Firm* — Craige Thompson; Thompson Patent Law

(57) ABSTRACT

A computer-implemented method for determining modeled roof age of a structure is provided. Such methods comprise identifying a target structure for which an estimated roof age is desired, receiving data related to the target structure in computer-readable form, and inputting the data related to the target structure into a generalized linear model to determine a Per-Property Modeled Roof Age of the target structure. The modeled roof age preferably accounts for (i) the height of the trees, (ii) the proximity of the trees to the target structure, and (iii) the weather conditions for the structure's geographic location. Such methods can be applied in practice by substituting a typically inaccurate reported roof age with a more realistic modeled roof age in making homeowners insurance decisions.

10 Claims, 10 Drawing Sheets

(56) References Cited

U.S. PATENT DOCUMENTS

| | | |
|---|---|---|
| 2002/0087389 A1 | 7/2002 | Sklarz et al. |
| 2007/0129954 A1 | 6/2007 | Dessureault |
| 2010/0208982 A1 | 8/2010 | Shimamura et al. |
| 2012/0066005 A1 | 3/2012 | Stewart et al. |
| 2012/0072239 A1* | 3/2012 | Gibbard ............ G06Q 10/10 705/4 |
| 2012/0331002 A1 | 12/2012 | Carrington |
| 2013/0035859 A1 | 2/2013 | Guatteri et al. |
| 2013/0110558 A1 | 5/2013 | Maher |
| 2013/0262029 A1 | 10/2013 | Pershing |
| 2013/0346020 A1 | 12/2013 | Pershing |
| 2014/0132409 A1 | 5/2014 | Billman et al. |
| 2015/0088556 A1 | 3/2015 | Convery et al. |
| 2015/0193881 A1 | 7/2015 | Emison |
| 2015/0235322 A1 | 8/2015 | Emison |
| 2015/0317740 A1 | 11/2015 | Emison et al. |
| 2016/0048925 A1 | 2/2016 | Emison et al. |
| 2016/0055594 A1 | 2/2016 | Emison |

OTHER PUBLICATIONS

Co-Pending U.S. Appl. No. 14/925,460, filed Oct. 28, 2015 (Published as US 2016/0048925 on Feb. 18, 2016).

Co-Pending U.S. Appl. No. 14/930,874, filed November 3, 2015 (Published as US 2016/0055594 on Feb. 25, 2016).

A. R. Huete, "A Soil-Adjusted Vegetation Index (SAVI)", Remote Sensing of Environment, vol. 25, pp. 295-309 (1988).

Co-Pending U.S. Appl. No. 14/147,266, filed Jan. 3, 2014 (Published as US 2015/0193881 on Jul. 9, 2015).

Co-Pending U.S. Appl. No. 14/185,215, filed Feb. 20, 2014.

Co-Pending U.S. Appl. No. 14/265,816, filed Apr. 30, 2014.

Emison and Tachovsky, "Part One: Homeowner-Supplied Roof Age is Disastrously Wrong", Claim Journal, Aug. 22, 2013, www.claimsjournal.com/news/national/2013/08/22/235434.htm, 4 pages.

Richardson et al., "Distinguishing vegetation from soil background information", Photogrammetric Engineering and Remote Sensing, vol. 43, pp. 1541-1552 (1977).

Co-pending U.S. Appl. No. 15/198,429, filed Jun. 30, 2016.

Wayback Machine Printout generated Jul. 21, 2016 relating to BuildFax Buyer's Report https://www.buildfax.com/files/FloridaExample1_BuyersReport.pdf, 1 pages, on Aug. 23, 2016 in U.S. Appl. No. 15/198,429, recites Saved 3 times between Nov. 25, 2011 and Mar. 10, 2012.

Chunsun Zhang et al: "Effective Seperation of Trees and Buildings for Automated Building Detection", Proceedings of the 32nd Asian Conference of Remote Sensing, Oct. 3, 2011 (Oct. 3, 2011), Taipe, Taiwan, XP055196543.

Jean-Pierre Lagouarde et al. "Spatialization of sensible heat flux over a heterogeneous landscape". Agronomie 22 (2002) 627-633.

Lim, Y.S. et al., "Calculation of Tree Height and Canopy Crown from Drone Images Using Segmentation", Journal of the Korean Society of Surveying, Geodesy, Photogrammetry and Cartography, vol. 33, No. 6, 605-613, 2015.

Mark Chopping et al. Large area mapping of southwestern forest crown cover, canopy height, and biomass using the NASA Multiangle Imaging Spectro-Radiometer. Remote Sensing of Environment 112 (2008) 2051-2063.

Nathalie Pettorelli et al. The Normalized Difference Vegetation Index (NDVI): unforeseen successes in animal ecology. Clim Res. vol. 46: 15-27, 2011.

Stefan Roettger, NDVI-based vegetation rendering, CGIM '07 Proceedings of the Ninth IASTED International Conference on Computer Graphics and Imaging, pp. 41-45, 2007.

Steven Chan et al. Vegetation Water Content. Preliminary, v.1 SMAP Science Document No. 047. Jan. 21, 2011 Jet Propulsion Laboratory. California Institute of Technology.

X. Zhou et al. Analysis and optimization of NDVI definitions and areal fraction models in remote sensing of vegetation. International Journal of Remote Sensing. vol. 30, No. 3, Feb. 10, 2009, 721-751.

* cited by examiner

METHOD OF MODELING ROOF AGE OF A STRUCTURE

CROSS-REFERENCE TO RELATED APPLICATIONS

The present application is a Continuation-in-Part (CIP) of U.S. patent application Ser. No. 14/147,266 filed Jan. 3, 2014, and is a Continuation-in-Part (CIP) of U.S. patent application Ser. No. 14/265,816 filed Apr. 30, 2014, the disclosures of which applications are incorporated herein by reference in their entireties.

BACKGROUND OF THE INVENTION

Field of the Invention

The present invention relates to techniques for modeling roof age of a structure, which techniques can be used in the homeowners insurance industry in providing more accurate insurance coverage and risk analysis. More particularly, the present invention relates to a computer-implemented method for modeling roof age of a structure based on a generalized linear model employing one or more variables that influence roof age determinations.

Description of Related Art

The cost of replacing a roof due to wind, hail, or other weather damage can be significant and depends on the type of materials being replaced. For example, the cost to professionally remove and replace asphalt shingles, the most common type of roofing material, can exceed $8,000 for a typical ranch style home. The cost to replace more expensive materials such as metal, tile, or slate can reach into the tens of thousands of dollars. Further, roof damage is present in 85-95% of wind-related insured property losses each year, according to the Insurance Institute for Business & Home Safety (IBHS), and loses from thunderstorms cost insurers $14.9 billion in 2012, according to the Insurance Information Institute.

As a typical homeowners insurance annual premium is only the fraction of the cost of a roof replacement, replacing a roof can be an expensive proposition for insurance companies. Although damage from wind, rain, and hail are typically covered by insurance policies, many insurance companies are taking steps to mitigate their losses. Because older roofs may be considerably weaker and thus more prone to damage, some insurance companies will not underwrite a policy with roof coverage for a home with a roof age over a certain limit. Also, some companies will only reimburse a depreciated value for a roof if it exceeds a certain age, such as ten years. Further, damage due to normal aging and wear and tear is typically not covered under home insurance policies. Thus, accurate information on the age of a roof at the time an insurance contract is underwritten is of considerable value to insurance companies.

Homeowners insurance companies have traditionally relied on the homeowner to provide roof age information at the time of underwriting. However, homeowner-supplied information on roof age is often based on inaccurate information or misrepresented (since homeowners have an incentive to underestimate roof age), and is not validated by insurance companies. Research by the present inventors has shown that more than two-thirds of all homeowner-supplied roof ages are underestimated by more than five years, and that more than twenty percent are underestimated by more than fifteen years (See Emison and Tachovsky, Homeowner-Supplied Roof Age is Disastrously Wrong, Claim Journal, 2013).

These underestimates can result in significant loses for insurance companies when underwriting or managing a homeowners insurance policy, paying claims, or determining premiums. Thus, there is a need in the insurance industry for more accurate methods for estimating roof age of a property. To this end, methods of the invention aim to solve this business challenge by providing a more realistic roof age of a property based on a per-property modeled roof age.

SUMMARY OF THE INVENTION

According to embodiments of the invention, a computer-implemented method for estimating roof age of a structure is provided. When referring to roof age of a structure, in the context of this specification this can refer to the year the structure was built, or the year the structure was built plus or minus a number of years (respectively to account for conditions that would either age a roof prematurely or add life to a roof), or roof age can refer to the actual age of the structure or roof (which can be determined by simple addition or subtraction of the roof year from the present year or some other point in time. For example, a roof of a structure built in 2001 could be said to have had a roof age of 10 years as of 2011. Since roof age can be determined easily from a year, the terms roof age and roof year may be used interchangeably in this specification.

The method comprises identifying a target structure for which an estimated roof age is desired, receiving data related to the target structure (e.g., in computer-readable form), and inputting the data related to the target structure into a generalized linear model to determine a Per-Property Modeled Roof Age of the target structure. The modeled roof age preferably accounts for (i) the height of the trees, (ii) the proximity of the trees to the target structure, and/or (iii) the weather conditions for the structure's geographic location. Such methods can be applied in practice by substituting a typically inaccurate reported roof age with a more realistic modeled roof age in making homeowners insurance decisions.

Provided in embodiments, for example, is a method for determining per-property modeled roof age, the method comprising:

(a) identifying a target structure for which a modeled roof age is desired;

(b) obtaining one or more digital images of the target structure within a selected geographical radius using one or more satellite or aerial imaging apparatus;

(c) identifying one or more tree within the selected radius from one or more signals represented in the digital image;

(d) determining from the signal, proximity of the tree to the target structure;

(e) converting intensity of the signal into height of the tree;

(f) identifying frequency of weather conditions for a geographic area in which the target structure is physically located;

(g) creating a mathematical model of roof age for the target structure based on:

(1) the height of the trees, (2) the proximity of the trees to the target structure, and (3) the frequency of weather conditions for the geographic area; and calculating a modeled roof age of the target structure using the model.

Such methods can comprise using the modeled roof age as a substitute for and/or as a more accurate alternative for reported roof age of the structure.

Other data related to the target structure may be used including age of the target structure (based on year built), type or rating of roofing material, number of stories, estimated height of home, one or more tree proximity measures, one or more tree height measures, and one or more weather factors in a geographic area of the target structure. The one or more weather factors may include frequency of local severe weather that threatens roofs, average wind speed in the area, record wind speed in the area, and average and record size of hail in the area. In embodiments, an Area Average Roof Age based on the data related to a plurality of structures in the vicinity of the target structure may be calculated according to methods described herein, and inputted into the generalized linear model to determine the Per-Property Modeled Roof Age of the structure. The tree proximity measure may be one or more tree proximity categories described herein.

Also included is a method (e.g., a computer-implemented method) for determining per-property modeled roof age, the method comprising: identifying a target structure for which a modeled roof age is desired; identifying a number of trees within a selected radius of the target structure; measuring tree height and proximity of the trees to the target structure; identifying weather conditions for a geographic area in which the target structure is physically located; creating a mathematical model of roof age for the target structure based on: (i) the height of the trees, (ii) the proximity of the trees to the target structure, and (iii) the weather conditions for the geographic area; calculating a modeled roof age of the target structure (e.g., on a computer comprising a central processing unit (CPU)) using the mathematical model; and using the modeled roof age as a substitute for reported roof age of the structure.

Such methods can comprise assigning the trees to a category defined by: (i) tall trees with a height of 20 feet and taller and located within a first radius surrounding the target structure; (ii) tall trees with a height of 20 feet and taller and located within a second radius surrounding the target structure that is larger than the first radius; (iii) medium trees with a height ranging from above 0 feet up to 20 feet and located within the first radius of the target structure; or (iv) medium trees with a height ranging from above 0 feet up to 20 feet and located within the second radius of the target structure.

When assigning the trees to a category as outlined above, for example, each category can be characterized as a "Positive Tree Proximity" if the trees in that category are capable of protecting structures in response to a particular weather condition or is characterized as a "Negative Tree Proximity" if the trees in that category are capable of damaging structures in response to a particular weather condition.

Additionally, according to embodiments, the mathematical model can be further based on: (i) age of the target structure, (ii) age of one or more structures within a radius of the target structure, (iii) type or rating of roofing material of the target structure, and/or (iv) number of stories or height of the target structure.

In embodiments, for example, the age of the target structure can be obtained from Census, County Tax Assessors, state Building Departments, or real estate databases. Alternatively or in addition, in embodiments, the type of roofing material of a target structure can be obtained from purchase orders or invoices from roofing material manufacturers or roofing material distributors, from home inspections, or from purchase orders from roofing contractors.

Alternatively or in addition, according to embodiments, the weather conditions can include one or more of: (i) frequency of weather in the geographic area capable of damaging roofs, (ii) average wind speed, (iii) record wind speed, (iv) average size of hail, (v) record size of hail, and/or (vi) intensity of weather-related fire incidents.

The methods can further comprise calculating an area average roof age based on data obtained from a plurality of structures in the geographical area in which the structure is located and using the area average roof age in the mathematical model.

Embodiments of the invention also include a method (e.g., a computer-implemented method) for determining per-property modeled roof age, the method comprising: identifying a target structure for which a modeled roof age is desired; identifying a number of trees within a selected radius of the target structure; measuring tree height and proximity of the trees to the target structure using vegetation density values obtained from satellite or aerial imagery; identifying frequency of weather conditions for a geographic area in which the target structure is physically located; creating a mathematical model of roof age for the target structure based on: (i) the height of the trees, (ii) the proximity of the trees to the target structure, and (iii) the frequency of weather conditions for the geographic area; calculating a modeled roof age of the target structure (e.g., on a computer comprising a central processing unit (CPU)) using the mathematical model; and using the modeled roof age as a substitute for reported roof age of the structure.

In embodiments, the tree height and proximity of the trees to the target structure can be obtained from vegetation density values. For example, the vegetation density values can be obtained from satellite or aerial imagery. Such satellite or aerial imagery can be NAIP imagery in embodiments. Further, for example, vegetation density values can be Normalized Difference Vegetation Index (NDVI) values.

Methods of the invention can use a mathematical model that is a generalized linear model, such as a Poisson regression.

In particular embodiments of any of the methods described in this specification, the mathematical model can be defined by the following equation:

Estimated roof year or age=[$A$*(Structure Age or Year Structure Built)]+[$B$*(Frequency of Weather in the Geographic Area Capable of Damaging Roofs)]+[$C$*(Positive Tree Proximity)]+[$D$*(Negative Tree Proximity)].

In other particular embodiments of methods described in this specification, the mathematical model can be defined by the following equation:

Estimated roof age=[$A1$*(Structure Age Between 0-15 yrs.)]+[$A2$*(Structure Age Between 16-30 yrs.)]+[$A3$*(Structure Age 31 yrs. or later)]+[$B$*(Frequency of Weather in the Geographic Area Capable of Damaging Roofs)]+[$C$*(Positive Tree Proximity)]+[$D$*(Negative Tree Proximity)].

In the equations for estimating roof age of a structure, optionally the roofing materials can be integrated as additional variables, where a different adjustment for each type and amount of roofing material is taken into account. For example, the equations can include the following variables:

To account for the material type of a roof, one or more of the following elements can be included in the equations: [$E$*(% of Roof that is Asphalt Shingle)]+[$F$*(% of Roof that is Tile)]+[$G$*(% of Roof that is Metal)]+[$H$*(% of Roof that is Slate)]+[$I$*(% of Roof that is Membrane]+[$J$*(% of Roof that is Cedar Shingle)], etc.

Various aspects of these embodiments and other embodiments will be set forth in the drawings and detailed description.

BRIEF DESCRIPTION OF THE DRAWINGS

The accompanying drawings illustrate certain aspects of embodiments of the invention and should not be used to limit or define the invention. Together with the written description the drawings serve to explain certain principles of the invention.

FIG. 6 is a screenshot illustrating an embodiment of a formatted XML output of the computer-implemented method of the invention.

FIGS. 7A-7B are screenshots illustrating an embodiment of a formatted HTML output of the computer-implemented method of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Figure 1:
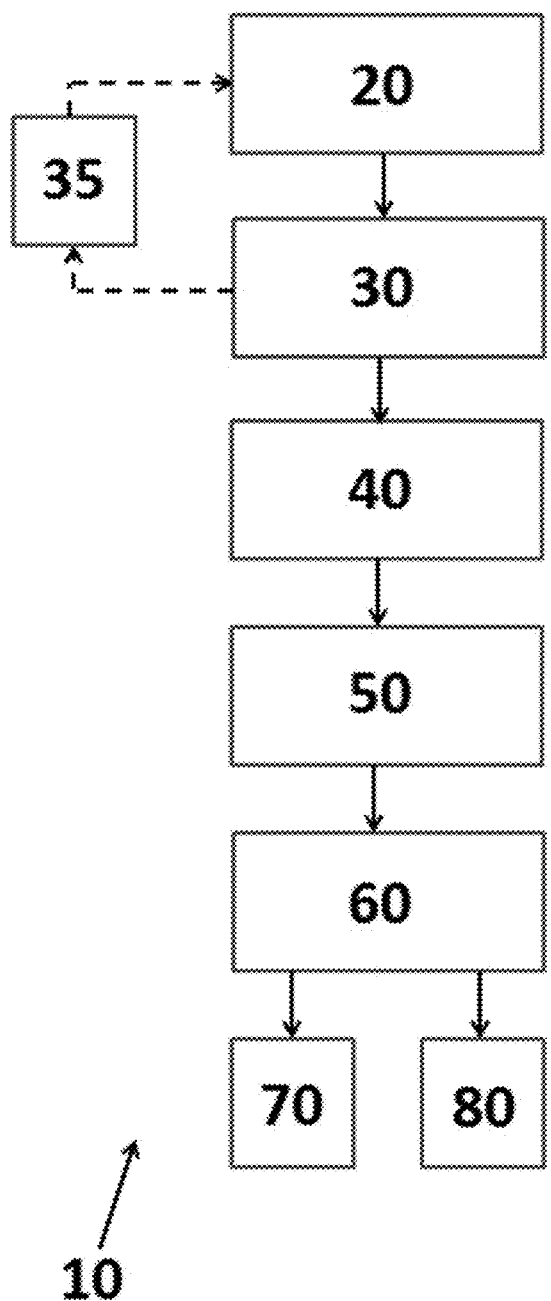
FIG. 1 is a flowchart illustrating an exemplary embodiment of a computer-implemented method of the invention.

FIG. 1 shows an exemplary embodiment of a computer-implemented method 10 of the present invention. Roof age data and related information is first obtained 20, and then the obtained data is converted to a database 30. A selection of the data in the database may then be audited 35 by comparing to the source data 20. After the data is converted into a standardized database 30, it may be analyzed to determine roof enforcement categorization 40, coverage area 50, and Area Average Roof Age 60, and based on these, may then calculate roof age 70 and roof age confidence 80. These steps will be elaborated further below. While an exemplary embodiment arranges these steps as shown in FIG. 1, it will be understood that other variations such as a different order or steps, or elimination, substitution, or addition of steps, may fall within the scope of the invention.

Obtaining Roof Age Information (20)

The computer-implemented method of the present invention, in embodiments, comprises obtaining roof age information and supporting information from a variety of sources. Sources of roof age information and supporting information include Census, County Tax Assessors and state Building Departments, as well as any other government agencies that will supply roof age information through a public records request. For example, some stage agencies (e.g., Texas Department of Insurance) have information on inspections of newly-replaced roofs, and usually supply files under a state open records request. Additional sources include roofing materials manufacturers, which have warranty information on roofs and roofing materials resellers which have delivery information on materials delivered to replace/install roofs; such warranty and delivery information may be available for license. However, these are just examples; the roof age information and supporting information may come from any suitable source.

Information for determining the roof age of residential and non-residential structures can be obtained from these sources through streamlined processes. The information may be obtained in a variety of electronic file formats, including delimited text files [CSVs], non-delimited text files, PDFs, word processing documents [Word], database backup files [Oracle, SQL Server], spreadsheet files [Excel]). The electronic file may be any electronic file suitable for storing data.

The computer-implemented method of the invention, in embodiments, further includes identification of roof replacements within the building permit data through the use of sophisticated text-mining analyses (to identify "roof replacement" but not "rooftop unit"). Text mining analyses may be prepared through Optical Character Recognition methods that convert typed texted into computer-readable text. The text mining analysis may use any of information retrieval, lexical analysis to study word frequency distributions, pattern recognition, tagging/annotation, information extraction, natural language processing, and data mining to perform the analysis.

In embodiments, SOLR (a Lucene-based software package) may be used for text-mining analysis. Exemplary methods of text-mining analysis may include developing a comprehensive set of key words that are present in building permit text that would be indicators of the type of work to be permitted (e.g., "roof", "rf", "shingle") based on input from experts in the construction industry. From the identified key words, a text-mining query can be created, and permits identified that contain the key words or combinations of the key words. From the results of permits matching the query, various permits can be randomly selected. The selected permits may then be audited to identify ways of modifying the queries to limit false positives. The queries can then be revised and the steps repeated until an acceptable false positive rate is reached.

In embodiments, the computer-implemented method may also acquire the property-level information on roof replacements from sources such as roof permits, inspections, roof warranties, and roof material deliveries and store the information in a large database of properties of dates of most-recent-roof-replacement on those properties.

Conversion to Standardized Database (30)

In embodiments of the computer-implemented method of the present invention, a variety of file formats (e.g., CSVs, PDFs, database backups) with different data layouts (e.g., tables and columns) can be used as input, and converted to a single, standardized relational-database-layout output as output. After the step of obtaining roof age information is obtained, the following steps are performed: preparation, loading, normalizing, mapping, and importing, as described below:

Preparation: take the file and make modifications to it so that it can be loaded into a database Loading: load the output of prep into a database Normalizing: modify the content and structure of the data in the database so that it fits preconditions to map. This includes organizing the fields and tables to minimize redundancy and dependency.

Mapping: map the content in the database (which is now in an arbitrary database layout) to a standardized database layout. The mapping may be performed in a variety of ways such as through the use of procedural code, creation of XSLT transforms or by using graphical mapping tools.

Importing: apply the mapping through an automated process to get the content into a standardized database layout.

The above processes can be performed by fixing corrupted and misaligned data, with streamlined user interfaces with minimal user input. As a result, the present method of conversion can process thousands of imperfect data files of permit data in a fraction of the time and cost that traditional Extract, Transform, and Load (ETL) software can perform. The present method of conversion can be performed by a person with average computer skills with a web browser.

Audit (35)

In an embodiment, the computer-implemented method of the invention optionally includes an audit to verify that the data out of import is substantially the same as what the source of the information provides, based upon automated internal checks and a manual review of the single-address open-records requests. For example, after an import is run, addresses within the original data submission may be randomly selected and single-address open-records requests for those to audit may be made.

Roof Enforcement Categorization (40)

Once the data is imported into the database, it is analyzed. In embodiments, roof age data such as building department permit data and census and tax assessor data are used to model/estimate roofing permit activity for each jurisdiction (area permitted by a building department), based upon the concept that some building departments will be enforcing the roof code such as through inspections to identify unpermitted work and some building departments will not be. In an exemplary embodiment, enforcement activity is identified by examining the number of roof permits in the building permit data as compared with the total number of overall permits, the local population, and the local number of structures.

From this analysis, for every building department and range of dates, an exemplary embodiment of the computer-implemented method of the present invention generates a local "roof enforcement" categorization:

Seldom/None
Average
Above Average
Well Above Average

The local roof enforcement categorization can be performed in any manner to achieve a set of enforcement categories appropriate for a particular situation. One example can include evaluating the level of roof enforcement for any geographical jurisdiction, such as Brownsville, Tex. If in this jurisdiction, the data indicates that 7% of all permits are roof permits and there are 80 roof permits per 10,000 population per year and 26 roof permits per 1,000 housing units, then for example this jurisdiction may be categorized as Average Enforcement. Any one or more of these factors can be used in any combination to create a set of enforcement levels for a particular situation. The values and numbers provided are merely for illustrative purposes and any appropriate value can be used for a particular threshold.

Further, for example, and in contrast to Brownsville, Tex., if the data indicates that in Santa Rosa, Calif., 19% of all permits are roof permits and there are 281 roof permits per 10,000 population per year and 708 roof permits per 1,000 housing units, then this jurisdiction may be categorized as having a level of enforcement that is higher than that of Brownsville, Tex., or for example as Above Average Enforcement.

In an embodiment, for example, 0-10 roof permits per 1,000 housing units may be considered Seldom/None, 11-100 roof permits per 1,000 housing units may be considered Average, 101-800 roof permits per 1,000 housing units may be considered Above Average, and over 800 roof permits per housing units may be considered Well Above Average. This factor can be the only factor in the analysis or combined with one or more of the factors mentioned above. There may be other factors that can be considered in the analysis as well. The examples and embodiments are provided merely as illustrative, and other ranges for these categories are also possible.

Coverage Area (50)

In an exemplary embodiment, the computer-implemented method of the invention includes calculation of a geographical footprint of the "Coverage Area" for each building department based upon the geospatial coordinates of the properties that were within the supplied building permits, the streets within the supplied building permits, and/or the census tract and block groups within the supplied building permits.

Area Average Roof Age (60)

In an exemplary embodiment, the present computer-implemented method uses tax assessor data (which contains a large list of properties and the years in which they were built), roof enforcement data, Coverage Area calculations, and the property-level roof replacement data as inputs to calculate an Area Average Roof Age for different geographical areas (e.g., zip5, city, county, zip3, Metropolitan Statistical Area (MSA), and state). Steps in this process, in embodiments, may include but not be limited to the following:

Properties are limited to those in the Coverage Area of building departments where the enforcement is at least Average.

All properties built shortly before the building permit data coverage starts through today are included, and the building permit data is assumed to contain all roof updates for those properties. In an embodiment, all properties built 10-15 years before the building permit data coverage starts through today are included, based on the jurisdiction which the property is in.

The average roof age of that set of properties is calculated and is termed NewerPropertiesAverageRoofAge.

The proportion of structures that were built significantly prior (e.g., 10-15 years, based on the jurisdiction) to the building permit data coverage time frame is calculated, and the NewerPropertiesAverageRoofAge is applied to them, but modified to their respective structure ages. This operation is calculated as OlderPropertiesAverageRoofAge.

The average roof age for any given area is calculated by the weighted average of OlderPropertiesAverageRoofAge and NewPropertiesAverageRoofAge for the area.

An exemplary roof age calculation may be performed as follows: (a) if data from Jan. 1, 2000 forward for a particular jurisdiction is available; (b) homes built in the jurisdiction from 1985 forward *with* roof updates in the data are identified; and (c) the average roof age of properties with roof updates in the data OR without permitted updates but built after Jan. 1, 2000 is calculated:

For example, if the entire set of data in such an example was 100 properties built in the year 1950 that had roof updates in the year 2000, and 50 properties built in the year 2005 without updates, then the average roof age of this jurisdiction would be about 12 years old, i.e., [100*(2014−2000)+50*(2014−2005)]/150.

Then, (d) a weighted average of (b) and (c) (weighted by the number of properties that fall into both categories) is calculated.

The computer-implemented method of the invention may return a Roof Age and Confidence score for every address in the 50 United States and the District of Columbia as follows:

Roof Age (70):

If property-level information on roof replacements is available, the age is based upon the date of the most recent roof replacement.

If a property-level roof update is not available, but is within the Coverage Area, then a "ranged" roof age is returned, which is between the age of the structure and the first date for which roof replacement data is available within the Coverage Area If the property is not within the Coverage Area, then the "Area Average Roof Age" for the smallest area that both contains the submitted address and for which the "Area Average Roof Age" is available is returned.

Roof Age Confidence (80):

If the property is within the Coverage Area, then the Roof Age Confidence is scored as "Modeled."

If the property is within the Coverage Area and property-level information on a roof replacement is available, then the Roof Age Confidence is scored as "High."

If the property is within the Coverage Area but property-level information on a roof replacement is not available, then Roof Age Confidence is scored as:

"High" if "roof enforcement" is Above Average or Well Above Average

"Medium" if "roof enforcement" is Average

"Low" if the "roof enforcement" is Seldom/None

Per-Property Modeled Roof Age

Another embodiment may comprise a method for determining a Per-Property Modeled Roof Age through a generalized linear model based on several factors that potentially influence roof age of a particular structure. Embodiments of the invention may comprise a computer-implemented method for estimating roof age of a structure, the method comprising identifying a target structure for which an estimated roof age is desired, receiving data related to the target structure in computer-readable form, and inputting the data related to the target structure into a generalized linear model to determine a Per-Property Modeled Roof Age of the target structure. In embodiments, the generalized linear model may be a Poisson regression, a logistic regression, multinomial logistic regression, or other type of generalized linear model known in the art.

The generalized linear model may be based on one or more factors related to the target structure that potentially influence roof age including age of the target structure (based on year built), type or rating of roofing material, number of stories, estimated height of home, one or more tree proximity measures, one or more tree height measures, and one or more weather factors in a geographic area of the target structure. The one or more weather factors may include frequency of local severe weather that threatens roofs, average wind speed in the area, record wind speed in the area, and average and record size of hail in the area. The tree proximity measures may include positive influences on roof age determinations ("Positive Tree Proximity") and negative influences on roof age determinations ("Negative Tree Proximity"). The generalized linear model may also be based on the Area Average Roof Age alternatively or in addition to one or more of the factors. The Area Average Roof Age may be calculated according to the methods described above.

Through the generalized linear model, a Per-Property Modeled Roof Age may be calculated based on one or more of these factors. The one or more factors may be provided in computer-readable form and stored in a database in a computer memory. The computer-readable forms of the data may be imported from a variety of file formats and converted to a standardized database format as described above. The one or more factors in computer-readable form may be used as input in the generalized linear model, and the output (Per-Property Modeled Roof Age) may be calculated by way of a computer processor. The Per-Property Modeled Roof Age may be based on any subset of the factors listed above. The Per-Property Modeled Roof Age may be based on anywhere from 2 to 20 different factors, including some not listed here.

In the model, Area Average Roof Age reflects overall weather conditions, with lower averages relative to the age of the home indicating frequent roof replacement in the area. Age of the target structure is used as a proxy for roof age. However, other indicators of weather affecting the home, such as frequency of local severe weather that threatens roofs, average area wind speed, record area wind speed, and average and record size of hail in the area, may be obtained from the U.S. National Weather Service and other sources for meteorological information for the smallest geographic area or the closest weather station to which the structure is located. The roofing material relates directly to the durability of the roof such that stronger materials such as metal or tile can significantly prolong the life of the roof before a replacement is needed. Table I below provides an example of different types of roofing materials and their estimated life span.

TABLE I

Roofing Material Life Span

| | |
|---|---|
| Asphalt (3-tab) | 15-20 yr. |
| Asphalt (laminated) | 20-30 yr. |
| Metal (coated steel) | 30-50 yr. |
| Plastic Polymer | 50+ yr. |

TABLE I-continued

Roofing Material Life Span

| | |
|---|---|
| Clay Tile | 50+ yr. |
| Concrete Tile | 50+ yr. |
| Slate | 75+ yr. |
| Wood (cedar) | 15-25 yr. |

Based on the estimated lifespan of the roofing material, different types of roofing materials may be assigned a rating (e.g. 1-10, 10-100) to be used in the model. Alternatively, the calculated roof age may be normalized according to the total estimated lifespan of the roofing material.

Tree proximity reflects how the home specifically handles weather. Data obtained by the present inventors indicates that tree proximity near a home can effectively be a double-edged sword when it comes to the risk of roof damage to a structure. Tall trees close to the home may be a hazard as they may fall and damage the roof, while tall trees further away may act as a wind break. Tall trees include trees or other vegetation with a height of 20 feet or higher, such as from 20-400 feet, or from 25-200 feet, or from 35-100 feet, or from 50-75 feet, and so on. Similarly, medium-height trees close to a structure may act as a source of protection for the structure against wind/hail loss, while medium-height trees further away from the structure may tend to cause more damage in wind/hail type weather conditions. In the context of this disclosure, medium-height trees refers to trees or other vegetation with a height of up to 20 feet, such as from 0-15 feet, or from 2-10 feet, or from 5-8 feet, and so on. Height in the context of this disclosure can refer to the actual height dimension of the tree or can refer to the difference in elevation between the top of the tree and the surface on which the target structure sits, such as the ground, or the difference in elevation between the top of the tree and another surface, such as the height of the roof of the structure.

Figure 2A:
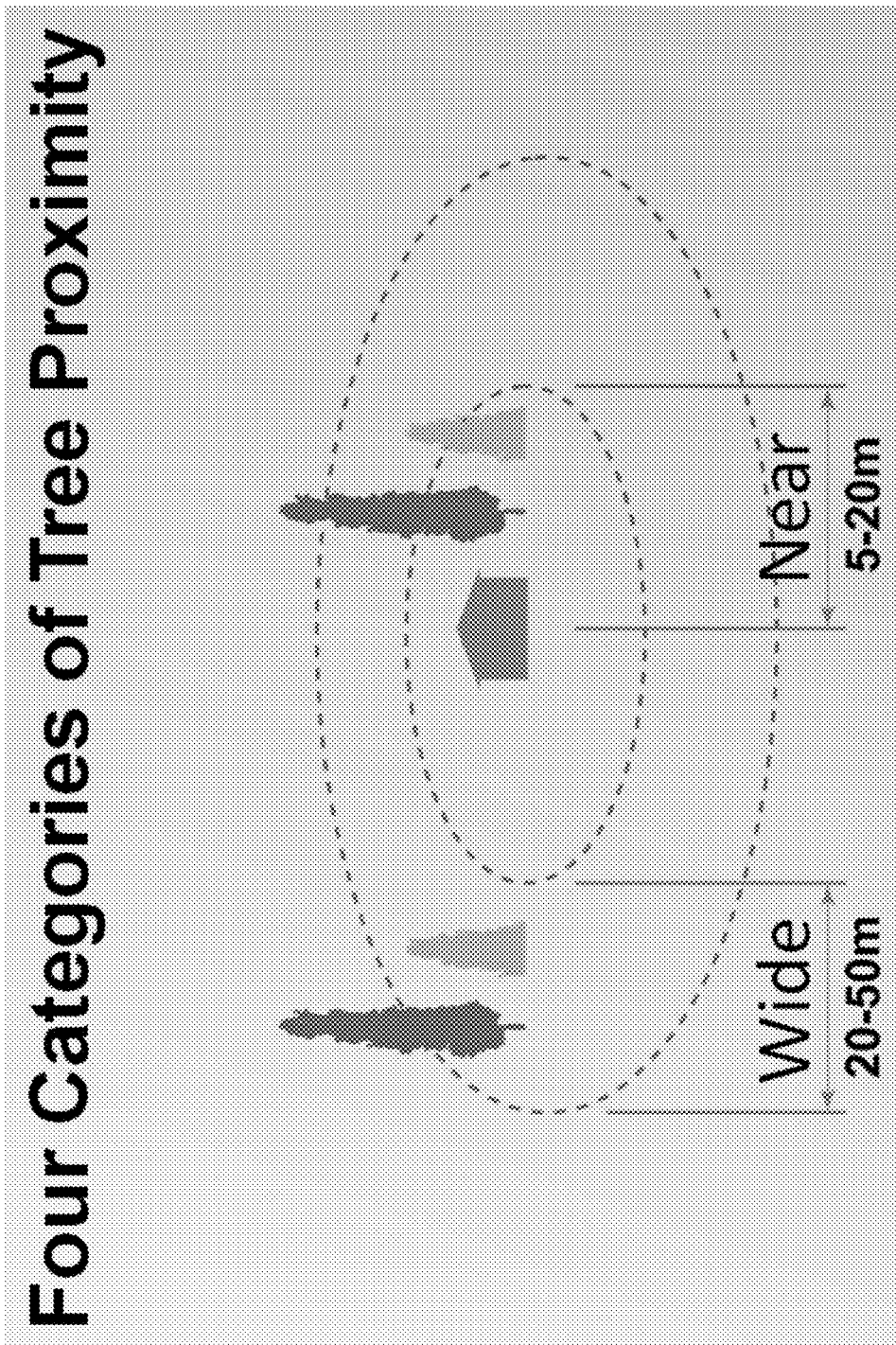
FIG. 2A is a schematic diagram showing four categories of tree proximity according to an embodiment of the invention.

It has been determined that there are four raw measures of tree proximity that may affect roof age: tall trees near a structure, such as a home (e.g. 5-20 meter radius), medium-height trees near a structure, such as a home (e.g. 5-20 meter radius), tall trees further away from the structure or home (e.g. 20-50 meter radius), and medium-height trees further away from the structure or home (e.g. 20-50 meter radius). These four raw measures are shown schematically in FIG. 2A. However, these specific radii used to determine the presence of tall or medium-height trees around the home are merely exemplary and other variations are possible as will be shown below.

The present inventors obtained a data set of 5+ Million Policy-Years from 2004-2013. The data set is a National (United States) set with a focus on six states. The data set focused on loss frequency and controlled for home age, roof age, property condition, and year built. The data set was used to create a generalized linear model (Poisson). The results showed that the effects of trees on loss frequencies were highly specific to the state where the data was gathered as well as the type of loss. For wind/hail loss, the presence of tall trees near a home (e.g. 5-20 meter radius) and medium-height trees further away from a home (e.g. 20-50 meter radius) were associated with increased loss frequency, while the presence of medium trees near a home (e.g. 5-20 meter radius) and tall trees further away from a home (e.g. 20-50 meter radius) were associated with reduced loss frequency. Such reduced loss frequency suggests protection from wind which is consistent with findings observed after Hurricane Hugo in the Carolinas, which showed that "[w]hile some structures were damaged by falling trees, most structures appeared to benefit from the shelter provided by trees" (see Hurricane Hugo One Year Later: Proceedings of a Symposium and Public Forum Held in Charleston, S.C., Sep. 13-15, 1990).

Figure 2B:
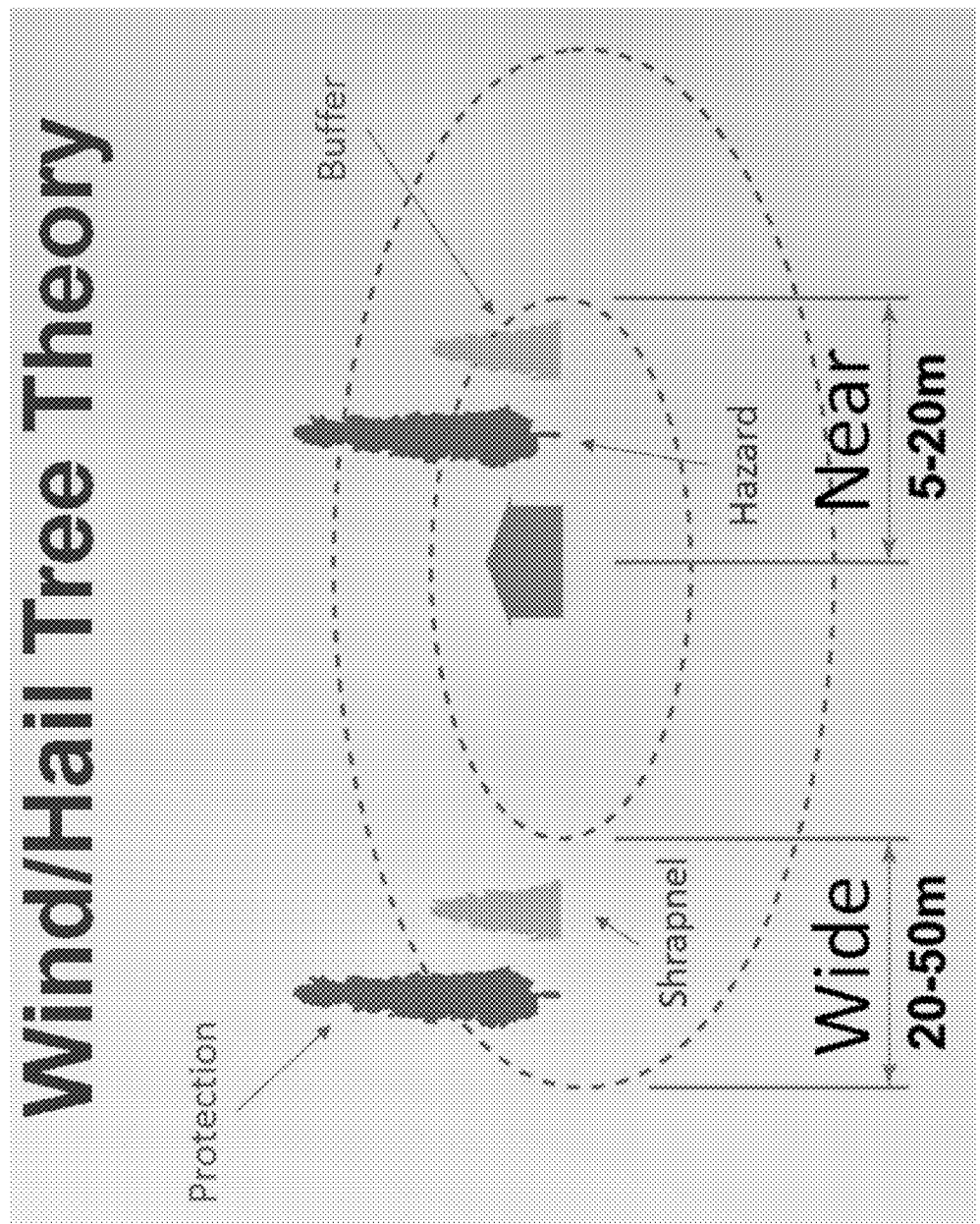
FIG. 2B is a schematic diagram showing a wind/hail theory according to the four categories of tree proximity shown in FIG. 2A.

Not wishing to be bound by theory, FIG. 2B represents a schematic diagram that provides a particular mechanistic explanation of the wind/hail loss data. As can be seen in the figure, tall trees physically located further away from the home (e.g. 20-50 meter radius) tend to protect the structure from wind/hail damage, while medium trees further away from the home (e.g. 20-50 meter radius) tend to serve as a source of shrapnel (loose branches, etc.). Conversely, tall trees physically located near a home (e.g. 5-20 meter radius) may represent a falling hazard, while medium trees near a home (e.g. 5-20 meter radius) may act as a buffer to wind.

For fire loss, such as loss to a structure or roof resulting from a wildfire, medium trees further away from a home (e.g. 20-50 meter radius) were associated with increased loss frequency, while paradoxically tall trees both closer to the home (e.g. 520 meter radius) and further away (e.g. 20-50 meter radius) were not. Such findings are consistent with final report issued by the Southern Forest Research Assessment, which observed "[a]s trees grow taller and their bark thickens, resistance to fire increases because crowns are higher above the heat of the flames and thicker bark insulates their cambium. The duration of exposure (residence time) also is an important consideration in prescribed fire".

Figure 2C:
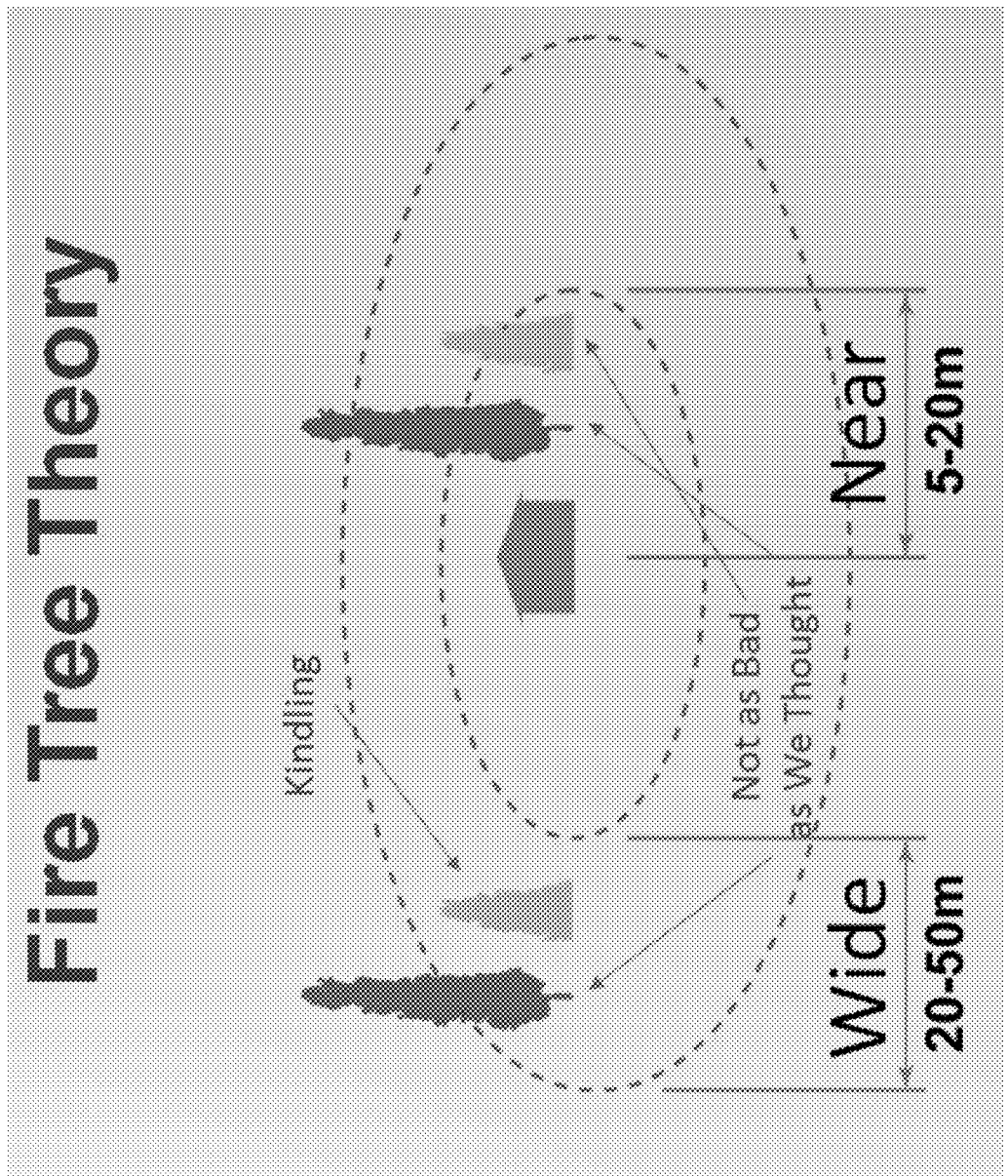
FIG. 2C is a schematic diagram showing a fire theory according to the four categories of tree proximity shown in FIG. 2B.

Again, not wishing to be bound by theory, FIG. 2C represents a schematic diagram that provides a particular mechanistic explanation of the inventors' fire loss data. As can be seen in the figure, medium trees physically located further away from the home (e.g. 20-50 meter radius) can in some cases serve as a source of kindling that helps to spread wildfires, while the other categories of trees do not.

Trees associated with increased loss frequency may be classified in the "Negative Tree Proximity" category and trees associated with decreased loss frequency may be considered to fall in the "Positive Tree Proximity" category. These categories may be based on the four raw measures of tree proximity described above, and may depend on the type of loss as well as the geographic area where loss is measured. The categories may be obtained from large data sets that focus on loss frequency and control for other factors such as home age, roof age, property condition, and year built.

Figure 3B:
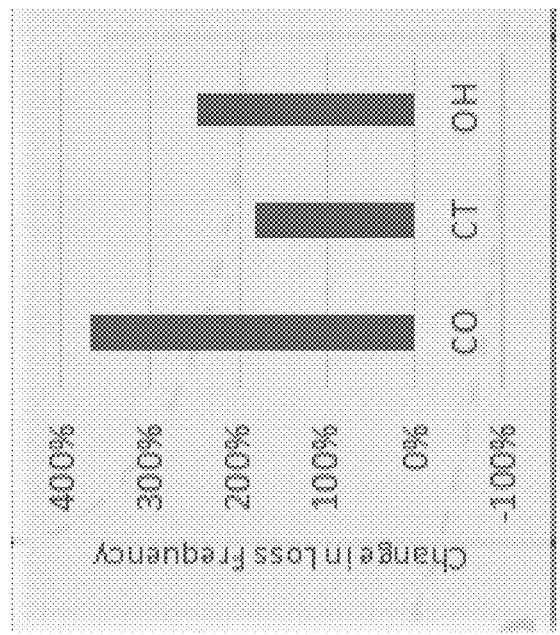
FIG. 3B is a graph of change in wind/hail loss frequency for homes in Colorado (CO), Connecticut (CT), and Ohio (OH) having medium trees within a 20-50 meter radius.
Figure 3A:
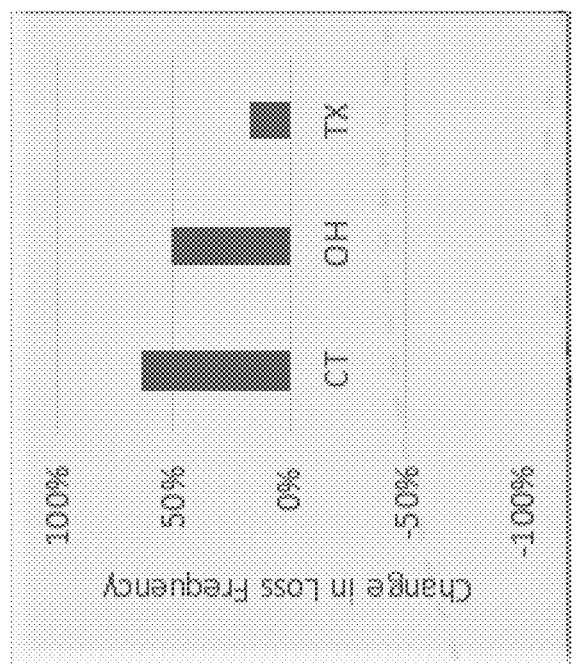
FIG. 3A is a graph of change in wind/hail loss frequency for homes in Connecticut (CT), Ohio (OH), and Texas (TX) with tall trees within a 5-20 meter radius.

Findings show that the effect of a particular tree proximity category on loss frequency is dependent on the state (e.g., a geographic area in which the structure is located, such as one of the United States) from which the raw measures of tree proximity and loss frequency are obtained, as well as the type of loss data. In particular, certain tree proximity categories are associated with increased wind/hail loss for certain geographic regions. For example, FIG. 3A shows the change in wind/hail loss frequency for homes in Connecticut (CT), Ohio (OH), and Texas (TX) having tall trees within a 5-20 meter radius compared to all homes in these regions. As shown in the graph, such trees were associated with increased wind/hail loss frequency, particularly for Connecticut (CT) and Ohio (OH). FIG. 3B shows the change in wind/hail loss frequency for homes in Colorado (CO), Connecticut (CT), Ohio (OH), and having medium-height trees within a 20-50 meter radius. As shown in the graph, such trees were associated with increased wind/hail loss frequency, particularly for Colorado (CO).

Figure 4A:
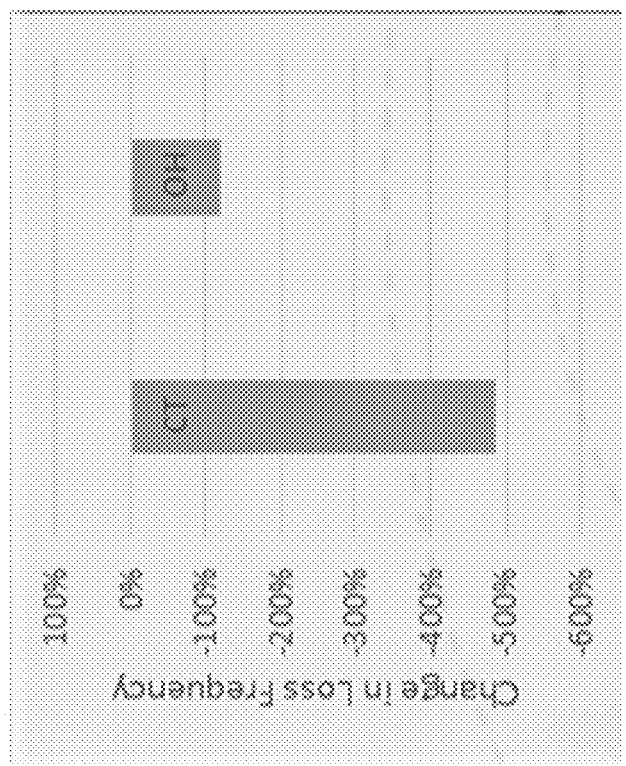
FIG. 4A is a graph showing change in wind/hail loss frequency for homes in Connecticut (CT) and Ohio (OH) having tall trees within a 20-50 meter radius.
Figure 4B:
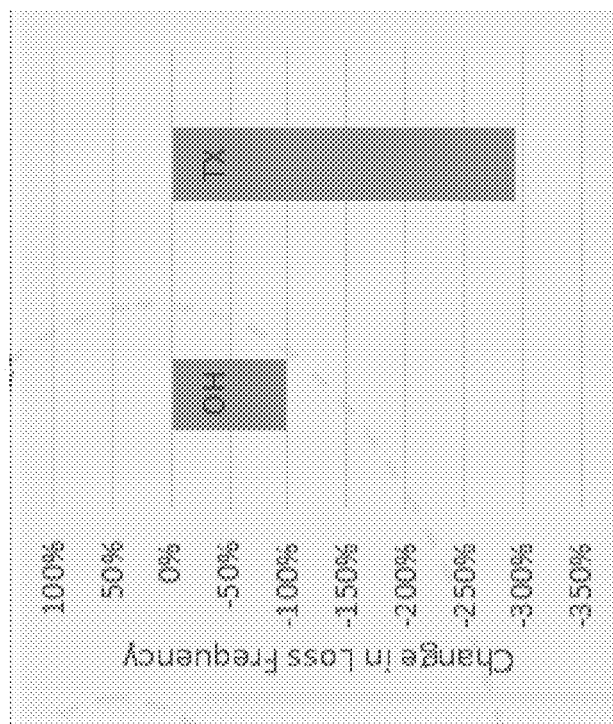
FIG. 4B is a graph showing change in wind/hail loss frequency for homes in Ohio (OH) and Texas (TX) having medium trees within a 5-20 meter radius.

It is apparent that certain tree proximity categories may also be associated with decreased wind/hail loss for certain regions. For example, FIG. 4A shows the change in wind/hail loss frequency for homes in Connecticut (CT) and Ohio (OH) having tall trees within a 20-50 meter radius compared to all homes in these regions. As shown in the graph, such trees were associated with decreased wind/hail loss frequency for both states and particularly in Connecticut (CT). FIG. 4B shows the change in wind/hail loss frequency for homes in Ohio (OH) and Texas (TX) having medium trees within a 5-20 meter radius compared to all homes in these regions. As shown in the graph, such trees were associated with decreased wind/hail loss frequency, particularly for Texas (TX), where severe thunderstorms are a frequent problem.

Tall trees or medium-height trees near a home may be determined by obtaining raw tree sensor data within a certain radius of the home. As used herein, "raw tree sensor data" may be any data obtained from any sensor and can include a sensor that is configured to record electromagnetic energy that is reflected, scattered, diffracted, refracted, or dispersed as a result of striking any part of a tree such as the leaves or needles. The electromagnetic energy may be visible light or invisible portions of the electromagnetic spectrum such as any infrared or ultraviolet wavelength. The raw data may be obtained from satellite or aerial imagery such as photographs or video of a geographic area. The satellite imagery may be from any meteorological satellite designed to image trees and other vegetation, which would include satellites housing radiometers such as those used for the United States Department of Agriculture's National Agriculture Imagery Program (NAIP), or the Advanced Very High Resolution Radiometer (AVHRR) and associated platforms. Meteorological satellites equipped with the AVHRR include the NOAA series of satellites, such as the Television Infrared Observation Satellite (TIROS) series. Table II provides the channel and wavelengths for the AVHRR/3 instrument. Channels 1 and 2, which represent visible and near-infrared wavelengths, respectfully, are particularly useful for monitoring vegetation.

TABLE II

AVHRR/3 Instrument Wavelengths by Channel

| Channel Number | Wavelength (um) |
|---|---|
| 1 | 0.58-0.68 |
| 2 | 0.725-1.00 |
| 3A | 1.58-1.64 |
| 3B | 3.55-3.93 |
| 4 | 10.30-11.30 |
| 5 | 11.50-12.50 |

Figure 5A:
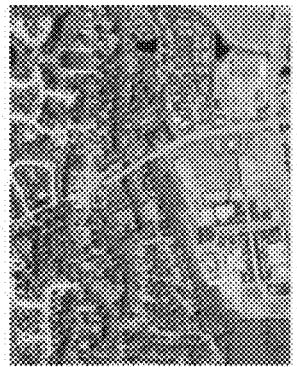
FIG. 5A is a United States Department of Agriculture's National Agriculture Imagery Program (NAIP) infrared image for a residential and commercial area according to an embodiment of this disclosure.
Figure 5B:
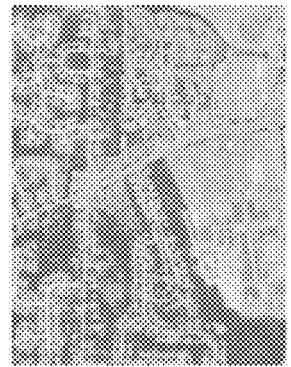
FIG. 5B is an NAIP Normalized Difference Vegetation Index (NDVI) image for a residential and commercial area according to an embodiment of this disclosure.
Figure 5C:
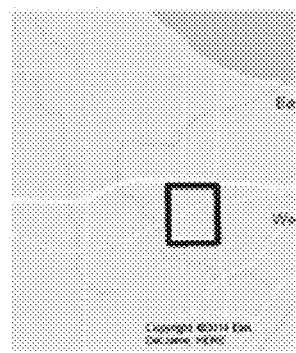
FIG. 5C is an image representing an overview of the residential and commercial area of FIGS. 5A and 5B.
Figure 5D:
FIG. 5D is an image of the residential and commercial area of FIGS. 5A and 5B showing tree identification according to an embodiment of the methods of this disclosure, wherein dark shading represents taller trees.

For example, aerial imagery from NAIP was used to identify trees for a residential and commercial area. NAIP imagery has a spatial resolution of up to 1 meter. FIG. 5A represents infrared imagery, FIG. 5B represents NDVI imagery, FIG. 5C represents an overview, and FIG. 5D represents an image showing tree identification (where darker shading represents taller trees), for a residential and commercial area. The images present a visual display of the signal and of the intensity of the signal received from the imaging apparatus. The visual display can present the signal and signal intensity as shading (a color-coded or gray-scale display with different signals and signal intensities represented by different colors or different shades of black, white, and gray). The images show visual examples of how one can take the NAIP image and identify trees in different areas with the methods of the disclosure.

However, in other embodiments, aerial video or photographs of vegetation from aircraft are used in substitution of the satellite imagery. The aerial photographs or video may be obtained from piloted aircraft or unmanned aircraft such as blimps or balloons, or Unmanned Aerial Vehicles (UAVs) including High Altitude Long Endurance (HALE) air vehicles. Some embodiments may be limited to satellite imagery, some embodiments may be limited to aerial imagery, and some embodiments may incorporate both satellite and aerial imagery. The imagery may be from any source, as long as it represents a multispectral or hyperspectral image which preferably includes both red and near-infrared spectral bands.

Further, in other embodiments, the raw data may be obtained from aerial measurements from instruments such as LiDAR instruments stationed on piloted or unmanned aircraft may be used alternatively or in addition to the aerial or satellite imagery data. The satellite imagery, aerial imagery, and/or LiDAR data may be obtained using any suitable infrared, visible, or ultraviolet wavelength or range of wavelengths. Further, the satellite imagery, aerial imagery, and/or LiDAR data may be obtained from various national, regional, or state governmental databases, from private databases, from academic databases, or may be obtained directly from satellites or aircraft.

After obtaining the raw tree sensor data, the present method uses the raw data to determine one or more tree characteristics. In one embodiment, the tree characteristics are based on vegetation density values that may be calculated from the satellite or aerial imagery. In an exemplary embodiment, the Normalized Difference Vegetation Index (NDVI) is used. The NVDI is calculated as:

$$NDVI = \frac{(NIR - VIS)}{(NIR + VIS)}$$

where VIS and NIR stand for the spectral reflectance measurements acquired in the visible (red) and near-infrared regions, respectively. However, alternatives to the NDVI may be used, including the Perpendicular Vegetation Index (See Richardson A. J. and C. L. Wiegand, 1977, 'Distinguishing vegetation from soil background information', Photogrammetric Engineering and Remote Sensing, 43, 1541-1552), the Soil-Adjusted Vegetation Index (See Huete, A. R., 1988, 'A soil-adjusted vegetation index (SAVI)', Remote Sensing of Environment, 25, 53-70), the Atmospherically Resistant Vegetation Index (See Kaufman, Y. J. and D. Tanre, 1992, 'Atmospherically resistant vegetation index (ARVI) for EOS-MODIS', in 'Proc. IEEE Int. Geosci. and Remote Sensing Symp. '92, IEEE, New York, 261-270) the Global Environment Monitoring Index (See Pinty, B. and M. M. Verstraete (1992) 'GEMI: A non-linear index to monitor global vegetation from satellites', Vegetation, 101, 15-20), or the Fraction of Absorbed Photosynthetically Active Radiation or FAPAR.

In other exemplary embodiments, the tree characteristics that are determined may be tree geometric dimensions, tree height, tree canopy, and/or a tree species classification resulting from LiDAR data. The tree species classification may be determined with the use of a classification algorithm such as hierarchical clustering, k-means clustering, linear discriminant analysis, logistic regression, support vector machines, k-nearest neighbor, decision trees, neural networks, Bayesian networks, and Hidden Markov models. In some embodiments, only LiDAR data is used, however, in other embodiments no LiDAR data is used. The tree characteristics may be vegetation density data only, tree height only, tree dimensions only, tree species only, or may be any combination of two or more of these characteristics.

In exemplary embodiments, the tree characteristics may be calculated for a given radius surrounding a structure or for a given radius surrounding an object such as a tree, including a radius of 5, 10, 15, 20, 25, 30, 40, 50, 60, 70, 80, 90, or 100 meters or more. In other exemplary embodiments, the tree characteristics may be calculated for a given geographic area, such as an address, tax parcel polygon, street, neighborhood or development, subdivision, zip5, city, county, zip3, Metropolitan Statistical Area (MSA), and state.

Embodiments of the invention may use structure location information which may include publically available geographic mapping information such as Google Maps, Bing, Mapquest, or ESRI geographic systems software, which map the address of a structure to a specific geographic location or geospatial coordinates. In embodiments, the structure location information corresponds to the tree sensor data such that tree characteristics within a specified radius of a structure or structures may be calculated. For example, the structure location information in Google Maps may be mapped to satellite imaging data such that the tree sensor data and tree characterization information may be partitioned into specific areas within a radius surrounding a structure, geographic location, or geospatial coordinates of interest. In embodiments, the structure information may be mapped so that it may overlay the tree sensor information and/or tree characteristic information and vice versa.

In other embodiments, tree characterization information or data is directly obtained from a government, academic, or a private source that has calculated this from raw tree sensor data such that the step of obtaining raw tree sensor information is bypassed. For example, this information can be obtained directly by anyone for use in the systems and methods of the invention, including obtained by an insurance agent or an insurance adjuster, where appropriate. The tree characteristic information may be obtained from any government, private, or academic source. Tree characteristic information, tree sensor information, insurance loss information, and structure location information may be stored in one or more electronic databases. Further, the tree characteristic information may be stored in the electronic database as either a vector (polygon) representation or a raster (gridded cell) representation.

Based on the NDVI, tall trees may be differentiated from medium-height trees such that tall trees produce a higher NVDI score than medium-height trees. This may be based on the presumption that tall trees have a higher density of foliage in a given area when imaged from above than medium-height trees. For example, higher NVDI scores may be associated with trees 50 feet or greater in height, while lower NVDI scores may be associated with trees 25-49 feet in height. In other embodiments, higher NVDI scores are associated with trees 40 feet or greater in height, while lower NVDI scores are associated with trees 20-39 feet in height. In other embodiments, higher NVDI scores are associated with trees 30 feet or greater in height, and lower NVDI scores are associated with trees 15-29 feet in height. In other embodiments, higher NVDI scores are associated with trees 20 feet or greater in height, and lower NVDI scores are associated with trees 10-19 feet in height.

Areas/pixels representing tall trees and areas/pixels representing medium trees may be identified for up to a 20 meter radius and within a 20-50 meter radius surrounding the structure. However, the method may use other radii cutoffs, such as a 5-15 meter radius, a 10-20 meter radius, a 10-25 meter radius, a 15-30 meter radius, a 15-40 meter radius, a 20-30 meter radius, a 20-40 meter radius, a 25-50 meter radius, a 30-50 meter radius, a 40-60 meter radius, and the like. The differentiation between tall and medium trees and the radii cutoffs may be based on the geographic area in which the raw tree sensor data is calculated, as well as the number of stories of the target structure (e.g., ranch, two stories, three stories, etc.). In one embodiment, the differentiation between tall and medium trees and the radii cutoffs may be based on an estimated height of the target structure. The number of stories of the target structure may be obtained from building permit information, tax assessor information, census information, or other sources of information described herein, and from the number of stories the height of the target structure may be estimated. The NVDI values may be calculated and/or represented as a signal intensity for one or more or every pixel in the areas surrounding each structure, and an algorithm may be used to determine whether each pixel represents a tall tree, a medium tree, or neither. Alternatively, each pixel may represent the height of a canopy in a geographic area or parcel surrounding the target structure. When pixels are assigned a value, the portions of each parcel (e.g., selected radius surrounding the structure) representing tall trees, medium-height trees, or neither may be established, for example as a percentage of each parcel. Alternatively, each parcel may be assigned a count of tall trees or medium-height trees based on the number of pixels in the parcel established as tall or medium-height trees. Thus, the four raw measures of tree proximity may be expressed as a portion or percentage of tall or medium-height trees in an area or parcel, a number of tall or medium-height trees in an area or parcel, or as binary representation (e.g. yes/no) that indicates whether or not tall or medium-height trees are present. Alternatively, the four raw measures may be expressed as a percentage of canopy height. Alternatively or in addition to the NVDI, data from LiDAR may be used to confirm or determine directly the height of the trees in the areas surrounding each structure.

The type of roofing materials may be obtained from roofing material manufacturers and roofing material distributers, sellers, or installers (roofing contractors). Such information may include purchase orders or invoices obtained from these companies. Other sources of this information may include home inspections and building permit information. Age of the target structure (home age) may be based on year built which may be obtained from the Census, County Tax Assessors and state Building Departments, or real estate databases such as Multiple Listing Service (MLS). The information may be compiled and stored in a database described herein. The Area Average Roof Age may be calculated according to the methods described herein.

Based on one or more factors including Area Average Roof Age, home age (based on year built), type or rating of roofing material, number of stories, estimated height of home, one or more tree proximity measures, one or more tree height measures, and one or more weather factors in a geographic area of the structures, a Per-Property Modeled Roof Age may be calculated based on one or more generalized linear models that assign weights to each of the factors. The Per-Property Modeled Roof Age may be calculated from the factors stored in a database and may be used by brokers and agents and other stakeholders in the home owners insurance industry to make insurance decisions.

Examples of generalized linear models of the invention include the following equations:

$$\text{Estimated roof year} = [A*(\text{Year Structure was Built or 30 year ago (whichever is greater)})] + [B*(\text{Frequency of Weather in the Geographic Area Capable of Damaging Roofs})] + [C*(\text{Positive Tree Proximity})] + [D*(\text{Negative Tree Proximity})]. \quad (1)$$

$$\text{Estimated roof age} = [A1*(\text{Structure Age Between 0-15 yrs.})] + [A2*(\text{Structure Age Between 16-30 yrs.})] + [A3*(\text{Structure Age 31 yrs. or later})] + [B*(\text{Frequency of Weather in the Geographic Area Capable of Damaging Roofs})] + [C*(\text{Positive Tree Proximity})] + [D*(\text{Negative Tree Proximity})]. \quad (2)$$

The following example, for illustrative purposes only, shows representative numbers used in Equation (1):

Estimated roof year=Year Built or 30 years ago (whichever is greater)−15*(Frequency of Bad Weather)+10*(Positive Tree Proximity)−15*(Negative Tree Proximity). So, in this example, A=1, B=−15, C=10, and D=−15. The coefficients to B, C, and D are between 0 and 1 (e.g., frequency of weather capable of damaging roofs (bad weather) is between 0 and 1, where 0 is no or little bad weather and 1 is a high frequency of bad weather; positive tree proximity is between 0 and 1, where 0 is no positive trees in proximity and 1 is all of the proximity is filled with positive trees; while negative tree proximity would be between 0 and 1, where 0 is no negative trees in proximity and 1 is all of the proximity is filled with negative trees). Accordingly, it can be seen that when there is a high frequency of bad weather for the geographic area in which the target structure is located, up to 15 years can be added to the age of the roof (i.e., up to 15 years are subtracted from the year built). Likewise, when there are trees within the selected proximity of the target structure that would have a positive effect on roof age, up to 10 years can be subtracted from the age of the roof (i.e., up to 10 years are added to the year built). And when there are trees within the selected proximity of the target structure that would have a negative effect on roof age, up to 15 years can be added to the age of the roof (i.e., up to 15 years subtracted from the year built). Or if there is a combination of positive trees and negative trees within the selected proximity of the target structure, the negative trees have a greater influence on roof age than the positive trees, since the magnitude of the factor associated with positive trees (10) is smaller than that of the negative trees (−15).

To account for the material type of a roof, one or more of the following elements can be included in the equations:

$$[E*(\% \text{ of Roof that is Asphalt Shingle})] + [F*(\% \text{ of Roof that is Tile})] + [G*(\% \text{ of Roof that is Metal})] + [H*(\% \text{ of Roof that is Slate})] + [I*(\% \text{ of Roof that is Membrane})] + [J*(\% \text{ of Roof that is Cedar Shingle})],$$

etc.

Equation (3) below combines the above elements with Equation (2):

$$\text{Estimated roof age} = [A1(\text{Structure Age Between 0-15 yrs.})] + [A2*(\text{Structure Age Between 16-30 yrs.})] + [A3*(\text{Structure Age 31 yrs. or later})] + [B*(\text{Frequency of Weather in the Geographic Area Capable of Damaging Roofs})] + [C*(\text{Positive Tree Proximity})] + [D*(\text{Negative Tree Proximity})] + [E*(\% \text{ of Roof that is Asphalt Shingle})] + [F*(\% \text{ of Roof that is Tile})] + [G*(\% \text{ of Roof that is Metal})] + [H*(\% \text{ of Roof that is Slate})] + [I*(\% \text{ of Roof that is Membrane})] + [J*(\% \text{ of Roof that is Cedar Shingle})] \quad (3).$$

The following example, for illustrative purposes only, shows representative numbers used in above Equation (3):

Estimated roof age=4*(Structure Age Between 0-15 yrs.)+8*(Structure Age Between 16-30 yrs.)+13*(Structure Age 31 yrs. or later)+3*(Frequency of Weather in the Geographic Area Capable of Damaging Roofs)−1.5*(Positive Tree Proximity)+3*(Negative Tree Proximity)+0*(% of Roof that is Asphalt Shingle)]−5*(% of Roof That is Tile)−6*(% of Roof That is Metal)−1*(% of Roof That is Slate)+1*(% of Roof That is Membrane)+1*(% of Roof That is Cedar Shingle). So, in this example, A1=4, A2=8, A3=13, B=3, C=−1.5, D=3, E=0, F=−5, G=−6, H=−1, I=1, and J=1.

However, variations of the above generalized linear models that fall within the scope of the invention will be apparent to a skilled artisan. These may be those employing more or less variables than above or using alternative variables.

Another example shows use of image classification and hedonic data to estimate roof year. First, high confidence roof age and insurance loss data are used to group each roof age into one of three categories: new, used, and failed. This is done by obtaining the actual roof age at the time of the insurance loss data, and creating geographically-specific ranges (by zip code) for those three categories. For example, in Ohio, it is found that new is 0-5 years, used is 6-15 years, and failed is 16 years and above. In California, it is found that new is 0-7 years, used is 8-18 years, and failed is 19 years and above. Second, imagery such as sub-meter-resolution satellite and/or aerial imagery and image-processing algorithms are used to image roofs to algorithmically determine new/used/failed based on imagery. Addresses are geocoded from the permit data to identify which image corresponds with each roof. There may be some geocoding error, but it is anticipated that it will be small enough that it does not impact the efficacy of the algorithm. Third, geographical and hedonic data on homes (year built, square footage, number of stories) are used to build a generalized linear model that uses the imagery classification (new/used/failed) and the hedonic data to estimate the roof year.

Computer-Executable Instructions

It will be understood that the various methods, processes, and operations of the present invention described and/or depicted herein may be carried out by a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device such as a processor to perform one or more of the specified processes and operations. The computer-executable instructions may be written in any suitable programming language.

Computer-Readable Medium

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to calculate Roof Age and Roof Age Confidence or a Per-Property Modeled Roof Age based on data stored in the database described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising any combination of software, hardware, or firmware.

Computers or Devices

Embodiments of the invention include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, and operations of the invention. The computer or device performing the specified calculations, processes, steps, and operations may comprise at least one processing element such as a central processing unit (i.e., CPU or processor) and a form of computer-readable memory which may include random-access memory (RAM) or read-only memory (ROM). The processor may perform one or more method steps of the invention such as calculating an Area Average Roof Age or a Per-Property Modeled Roof Age according to the set of computer-executable instructions. The Area Average Roof Age and Per-Property Modeled Roof Age may be calculated based on the computer-readable data described herein. The computer-executable instructions can be embedded in computer hardware or stored in the computer-readable memory such that the computer or device may be directed to perform one or more of the processes and operations depicted and/or described herein.

Computer Systems

Additional embodiments of the invention comprise a computer system for carrying out the computer-implemented method of the invention. The computer system may comprise a processor for executing the computer-executable instructions, one or more databases described herein, a user interface, and a set of instructions (e.g. software) for carrying out the method. The computer system can be a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal database. The central computer may perform the computer-implemented method based on input and commands received from remote computers through the internet.

Figure 6:
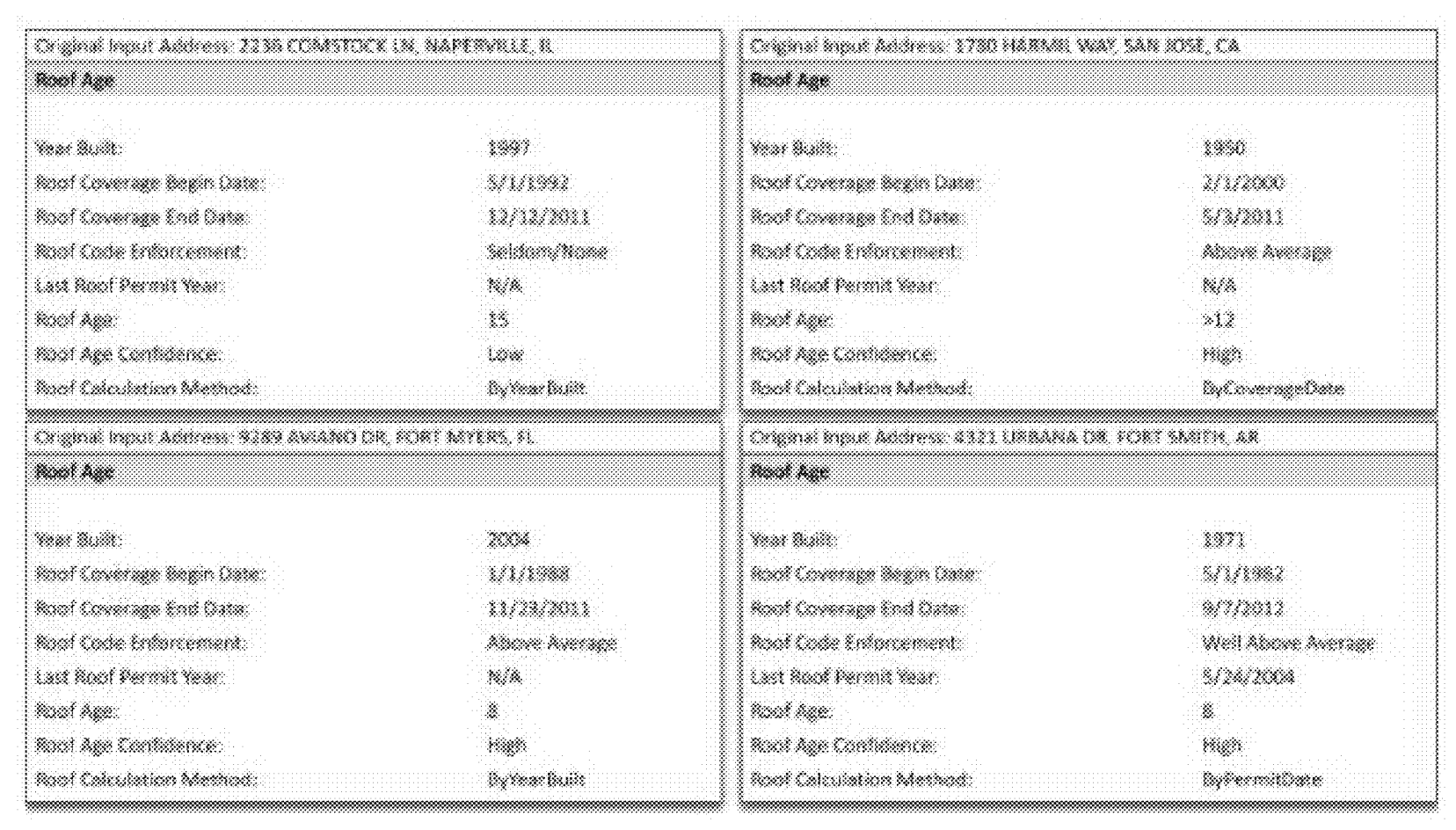
Figure 7A:
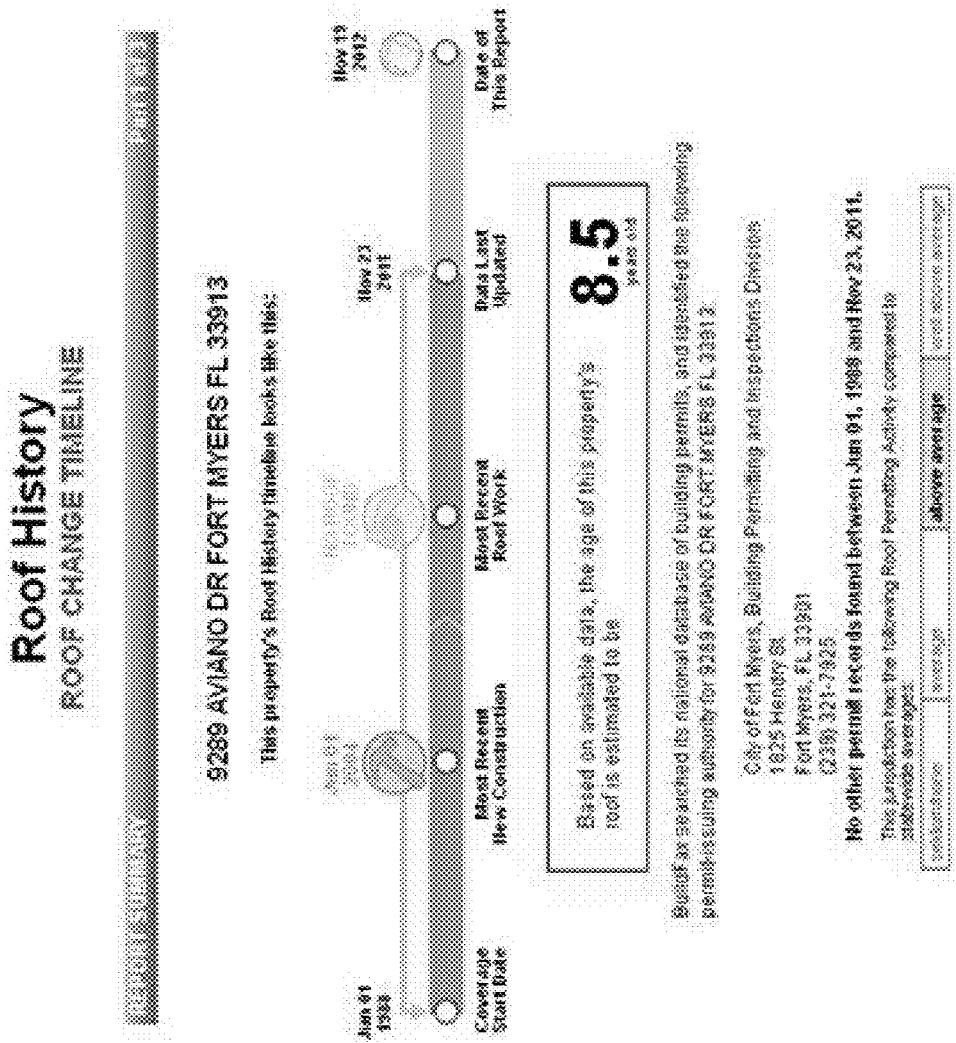
Figure 7B:
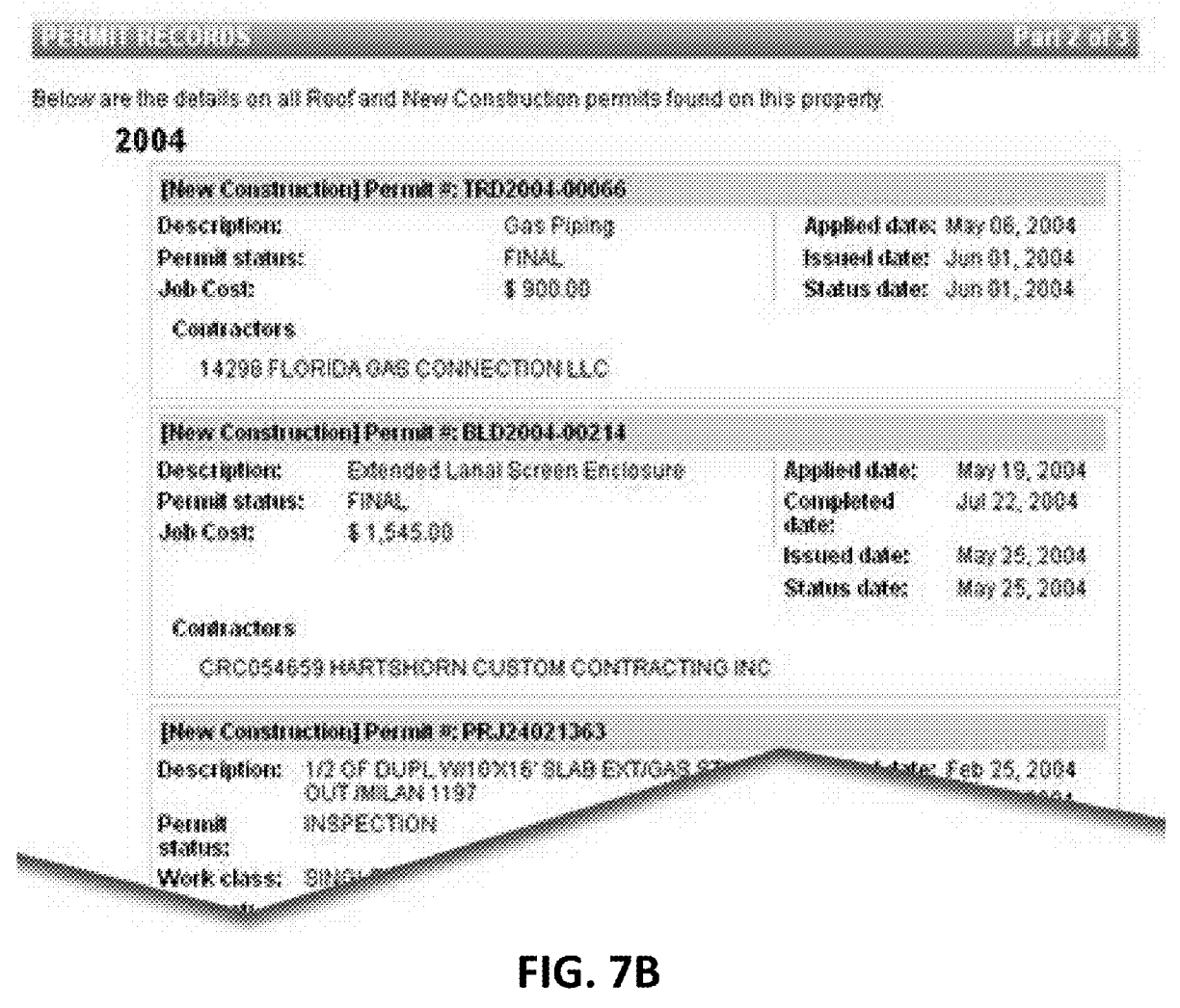

The user interface may be a graphical user interface which may be used in conjunction with the computer-executable code and databases. For example, the graphical user interface may allow a user to input a property address, perform a search for the property in the database, calculate Roof Enforcement, Roof Age, And Roof Age Confidence for the property based on area averages, or a Per-Property Modeled Roof Age, and display these and other results of the computer-implemented method of the invention in a variety of report formats such as in formatted XML as shown in FIG. 6 or formatted HTML as shown in FIGS. 7A and 7B, or save a PDF file or print a hardcopy of the results. The graphical user interface may allow a user to perform these tasks through the use of text fields, check boxes, pull-downs, command buttons, and the like. The interface may provide access to information in internal databases or include links to external databases. A skilled artisan will appreciate how such graphical features may be implemented for performing the tasks of the invention. The user interface may optionally be accessible through a computer connected to the internet. In one embodiment, the user interface is accessible by typing in an internet address through a web browser and logging into a web page. The user interface may then be operated through a remote computer accessing the web page.

Such graphical controls and components are reusable class files that are delivered with a programming language. For example, pull-down menus may be implemented in an object-oriented programming language wherein the menu and its options can be defined with program code. Further, some programming languages integrated development environments (IDEs) provide for a menu designer, a graphical tool that allows programmers to develop their own menus and menu options. The menu designers provide a series of statements behind the scenes that a programmer could have created on their own. The menu options may then be associated with an event handler code that ties the option to specific functions. Text fields, check boxes, and command buttons may be implemented similarly through the use of code or graphical tools. A skilled artisan can appreciate that the design of such graphical controls and components is routine in the art.

Applications

The Roof Age and Confidence scores and Per-Property Modeled Roof Age that the computer-implemented method of the present invention calculates are useful in the following ways:

Underwriting—Renewals

For insurance carriers which offer different products and rates based upon roof age (e.g., some products or endorsements require that the customer have a roof under a certain age; other products have discounts/surcharges/rates based upon roof age), getting an accurate roof age as part of the renewal process can significantly improve their business. For example, carriers may just use the High and Medium confidence roof ages, unless they are going to consult individually (on the phone or in person) with the insured, in which case they may use all of the confidence levels. Carriers may also use the Per-Property Modeled Roof Age to account for variables such as tree proximity.

Claims

If a roof needs to be replaced, almost all insurance companies will pay out the depreciated amount of the roof up front, and then, if a customer has "replacement-cost coverage", the carrier will pay out the rest of what it cost to replace the roof after the roof is fully replaced (and if the customer has "replacement-cost coverage", they only get the depreciated amount). Because of this, having an accurate roof age means more accurate depreciation, which is of considerable value to insurance carriers.

Marketing Leads

Carriers may use High confidence Roof Ages that are low (usually <=6 years old) to target structures with new roofs with offers for insurance, usually with a discount because of the newer roof.

Underwriting—New Business

The alternative to Roof Age is for the carrier to ask the insured and the agent to decide together what the roof age of the structure is. This ends up with significantly underestimated roof age, so obtaining Roof Age as a calculation from the computer-implemented method of the invention is very valuable. The following is an Example of how Roof Age can be used by an insurance company.

Example 1

An Insurance Agent accesses a webpage with a graphical user interface of the invention and enters the address of the structure in an input form, and the computer-implemented method of the invention returns the Roof Age (but not the Confidence) to the Agent. The Agent and Insured then decide to accept that Roof Age as correct, or to change it, and then they submit that to the carrier.

If the Agent and Insured do not change the Roof Age, or the Confidence was Low or Modeled (which the carrier can see, but the Agent/Insured could not), or the change to the roof age is small, then the carrier will accept the submitted Roof Age.

If the Agent and Insured change the Roof Age, and the Roof Age had High or Medium confidence, and the change to the Roof Age is significant, then the carrier may reject the submitted roof age unless the Insured provides additional documentation supporting the changed Roof Age.

Example 2

An Insurance Agent accesses a webpage with a graphical user interface of the invention and enters the address of the structure in an input form, and the computer-implemented method of the invention returns the Per-Property Modeled Roof Age based on one of the generalized linear models of the invention. The computer implemented method may also return one or more of the variables that were used to calculate the Per-Property Modeled Roof Age. The Agent and the insured then review the Per-Property Modeled Roof Age to determine if it is more accurate than the reported roof age. The Agent then submits the Per-Property Modeled Roof Age to the insurance carrier as a substitute for the roof age of record and/or reported.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Embodiments "comprising," "having," or "including" various features may alternatively "consist of" or "consist essentially of" any one or more of those features or may include additional features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method for determining per-property modeled roof age, the method comprising:
   identifying a target structure;
   obtaining one or more digital images of the target structure within a selected geographical radius using one or more satellite or aerial imaging apparatus;
   identifying a number of one or more trees within the selected geographical radius from one or more signals represented in the one or more digital images;
   determining from the signal, proximity of the trees to the target structure;
   converting, by a computer processor, intensity of the signal into height of the trees;
   identifying type and frequency of weather conditions for a geographic area in which the target structure is physically located;
   determining a modeled roof age for the target structure as a substitute for reported roof age of the target structure using a generalized linear model based on:
      (a) the following Positive Tree Proximity factors providing protection to the roof of the target structure or Negative Tree proximity factors presenting a hazard:
         (i) trees having a height within a first height range and located within a first radius surrounding the target structure;
         (ii) trees having a height within the first height range and located within a second radius surrounding the target structure that is larger than the first radius;
         (iii) trees having a height within a second height range and located within a first radius surrounding the target structure, wherein the second height range is smaller than the first height range and does not overlap; and
         (iv) trees having a height within the second height range and located within the second radius surrounding the target structure; and
      (b) the frequency of weather conditions for the geographic area; and
   displaying the modeled roof age of the target structure.

2. The method of claim 1, wherein the Positive and Negative Tree Proximity factors are further defined as:
   (i) tall trees with a height of 20 feet and taller and located within a first radius surrounding the target structure;
   (ii) tall trees with a height of 20 feet and taller and located within a second radius surrounding the target structure that is larger than the first radius;

(iii) medium trees with a height ranging from above 0 feet up to 20 feet and located within the first radius of the target structure; or (iv) medium trees with a height ranging from above 0 feet up to 20 feet and located within the second radius of the target structure.

3. The method of claim 1, wherein the generalized linear model is further based on:

(i) age of the target structure, (ii) age of one or more structures within a radius of the target structure, (iii) type or rating of roofing material of the target structure, and/or (iv) number of stories or height of the target structure.

4. The method of claim 3, wherein the age of the target structure or the age of the structures within a radius of the target structure is obtained from Census, County Tax Assessors, state Building Departments, or real estate databases.

5. The method of claim 3, wherein the type of roofing material is obtained from purchase orders or invoices from roofing material manufacturers or roofing material distributors, from home inspections, or from purchase orders from roofing contractors.

6. The method of claim 1, wherein the weather conditions include one or more of:

(i) frequency of weather in the geographic area capable of damaging roofs, (ii) average wind speed, (iii) record wind speed, (iv) average size of hail, (v) record size of hail, and/or (vi) intensity of weather-related fire incidents.

7. The method of claim 1, further comprising calculating an area average roof age based on a plurality of structures in the geographical area in which the target structure is located and using the area average roof age in the generalized linear model.

8. The method of claim 1, wherein the generalized linear model is a Poisson regression.

9. The method of claim 1, wherein the generalized linear model is defined by the following equation:

$$\text{modeled roof age, expressed as } a \text{ year} = [A*(\text{Year Structure was Built})] + [B*(\text{Frequency of Weather in the Geographic Area Capable of Damaging Roofs})] + [C*(\text{Positive Tree Proximity})] + [D*(\text{Negative Tree Proximity})],$$

wherein:

A, B, C, and D are each independently a number between −30 and +30; and the Frequency of Weather, the Positive Tree Proximity, and the Negative Tree Proximity is each independently selected from a number between 0 and 1.

10. The method of claim 1, wherein the generalized linear model is defined by the following equation:

$$\text{modeled roof age} = [A1*(\text{Structure Age Between 0-15 yrs.})] + [A2*(\text{Structure Age Between 16-30 yrs.})] + [A3*(\text{Structure Age 31 yrs. or later})] + [B*(\text{Frequency of Weather in the Geographic Area Capable of Damaging Roofs})] + [C*(\text{Positive Tree Proximity})] + [D*(\text{Negative Tree Proximity})];$$

wherein:

A1, A2, and A3 are each a number between 0 and 30;

B, C, and D are each independently a number between −30 and +30; and the Frequency of Weather, the Positive Tree Proximity, and the Negative Tree Proximity is each independently selected from a number between 0 and 1.

* * * * *